United States Patent [19]

Pierce et al.

[11] Patent Number: 5,231,562
[45] Date of Patent: Jul. 27, 1993

[54] DESK TOP WIRE MANAGEMENT APPARATUS

[76] Inventors: Lawrence Pierce, 2650 William Ave., Holland, Mich. 49424; Robert L. Shaw, 1099 S. 96th Ave., Zeeland, Mich. 49464; John A. Proos, 1037 Michigan St., Grand Rapids, Mich. 49503

[21] Appl. No.: 636,764

[22] Filed: Jan. 2, 1991

[51] Int. Cl.$^5$ .................................... H02B 1/20
[52] U.S. Cl. ............................ 361/428; 108/50; 174/48; 312/194; 361/391; 439/131
[58] Field of Search ............. 49/489; 108/50, 111, 108/153; 174/48, 50, 54, 55, 57, 65 R, 66; 312/194, 196, 223; 361/332, 336, 338, 340, 344, 359, 390, 391, 428; 364/908; 439/131

[56] References Cited

U.S. PATENT DOCUMENTS

| | | | |
|---|---|---|---|
| 1,689,414 | 10/1928 | Trammell | 312/223 |
| 1,905,402 | 4/1933 | Sink | 312/223 |
| 1,999,157 | 4/1935 | Rand | 312/223 |
| 2,695,762 | 11/1954 | Wersching | 248/52 |
| 3,245,741 | 4/1966 | Bartlett | 312/223 |
| 3,361,508 | 1/1968 | Chassevent | 312/223 |
| 3,373,703 | 3/1968 | Barecki | 108/50 |
| 3,464,749 | 9/1969 | Bishop | 312/223 |
| 3,497,281 | 2/1970 | Wilde | 312/223 |
| 3,635,174 | 1/1972 | Ball et al. | 108/223 |
| 3,646,244 | 2/1972 | Cole | 174/48 |
| 3,770,334 | 11/1973 | Weber | 312/223 |
| 3,783,175 | 1/1974 | Timmons | 312/223 |
| 3,784,270 | 1/1974 | DeLapp | 312/223 |
| 3,862,785 | 1/1975 | Scheerhorn et al. | 312/223 |
| 3,873,758 | 3/1975 | VanGessel et al. | 174/48 |
| 3,883,202 | 5/1975 | Konig | 312/223 |
| 4,094,561 | 6/1978 | Wolff et al. | 312/223 |
| 4,163,867 | 8/1979 | Breidenbach | 174/48 |
| 4,224,769 | 9/7980 | Ball et al. | 312/140.1 |
| 4,296,981 | 10/1981 | Hildebrandt et al. | 312/223 |
| 4,323,291 | 4/1982 | Ball | 312/223 |
| 4,372,629 | 2/1983 | Propst et al. | 439/131 |
| 4,535,577 | 8/1985 | Tenser et al. | 174/48 |
| 4,535,703 | 8/1985 | Henriott et al. | 312/85 |
| 4,551,577 | 11/1985 | Byrne | 439/131 |
| 4,654,756 | 3/1987 | Wilson et al. | 361/428 |
| 4,734,826 | 3/1988 | Wilson et al. | 361/428 |
| 4,747,020 | 5/1988 | Brickley et al. | 361/428 |
| 4,747,788 | 5/1988 | Byrne | 174/57 |
| 4,766,422 | 8/1988 | Wolters et al. | 312/194 |
| 4,792,881 | 12/1988 | Wilson et al. | 361/428 |

FOREIGN PATENT DOCUMENTS 0635734  1/1962  Canada .................................. 174/48

*Primary Examiner*—Leo P. Picard
*Assistant Examiner*—Donald A. Sparks

[57] ABSTRACT

A desktop wire management apparatus comprises an elongated wire storage compartment removably mountable under an access opening in the desktop, a forwardly openable front door in a front wall of the wire storage compartment, and a self contained wiring module removably mountable in a wiring module opening in a rear wall of the wire storage compartment at a vertical position above the bottom of the wire storage compartment. An access door is pivotally mounted in a frame in the desktop access opening, with a temporary power tap being mounted on the underside of the access door.

11 Claims, 5 Drawing Sheets

DESK TOP WIRE MANAGEMENT APPARATUS

BACKGROUND OF THE INVENTION

This invention relates to apparatus for storing and managing wiring used in connection with desktop applications.

A number of products have been developed for storing and managing wires for use in desktop applications. Typically, such systems include a compartment or tray mounted underneath the desktop and an opening in the desktop or a slot at the rear edge of the desktop for feeding wiring from the wire storage compartment to desktop electrical or electronic appliances, such as calculators, computers, telephones, fax machines, lighting appliances or the like. Some wiring systems have access doors mounted over the openings or slots in the desktop. The access doors may be opened or closed to gain access to the interior of the wiring compartments and may have slots or openings therein for feeding wiring to the desktop devices. Electrical outlets may be incorporated into the wiring compartments.

The present invention comprises an improved desktop wire management system that is adaptable to a wide range of desktop applications and may be retrofitted in existing desktops.

Another object of the present invention is to provide a wire management system wherein outlets for electrical power and communications cables can be incorporated into the apparatus in the form of a self contained removable modules. This makes it possible to obtain electrical certification for the modules themselves regardless of the desktop application in which the modules are employed.

SUMMARY OF THE INVENTION

A desktop wire management apparatus in accordance with the present invention comprises an elongated wire storage compartment removably mountable on the underside of the desktop. The wire storage compartment is generally rectangular in shape and has an open top that is adapted to communicate with an opening in the desktop. Front and rear walls extend downwardly from the desktop and a bottom encloses lower ends of the walls. The front wall has an access opening therein, and an openable front cover is mounted over the opening. The front cover is openable in a forward direction toward the front of the desktop. The rear panel of the compartment includes a wiring module opening therein positioned above the bottom of the compartment.

A self-contained wiring module is removably mountable in the wiring module opening. The wiring module includes a face plate that is mounted in the wiring module opening. Wiring outlet receptacles are mounted on the rear side of the face plate in openings in the face plate and are accessible from the interior of the wiring compartment. Rear portions of the receptacles and wiring therefor are enclosed by a module cover, which has an outlet opening for wiring egress to an appropriate power or signal source. The module is self-contained and operable even when separated from the wire storage compartment, the module being held in place in the wiring compartment by releasable fastener means that permit easy mounting and removal of the module in the wiring compartment.

Desirably, the wiring module is mountable and removable in the wiring compartment through the front access opening in the compartment while the compartment is mounted on the underside of a desktop.

Another feature of the present invention is an openable wire access door pivotally mounted in a frame that is in turn mounted in an opening in the desktop above the wire storage compartment. The door opens to the side and has an access slot along a front edge. A temporary power tap can be removably mounted on the underside of the door such that outlets pivot up into an accessible position and the cord end of the power tap pivots downwardly into the desktop opening where the access door is opened. A flange at the rear of the slot conceals the power tap from view.

These and other features of the present invention are described in more detail below and shown in the appended drawings.

DETAILED DESCRIPTION OF PREFERRED EMBODIMENTS

Figure 1:
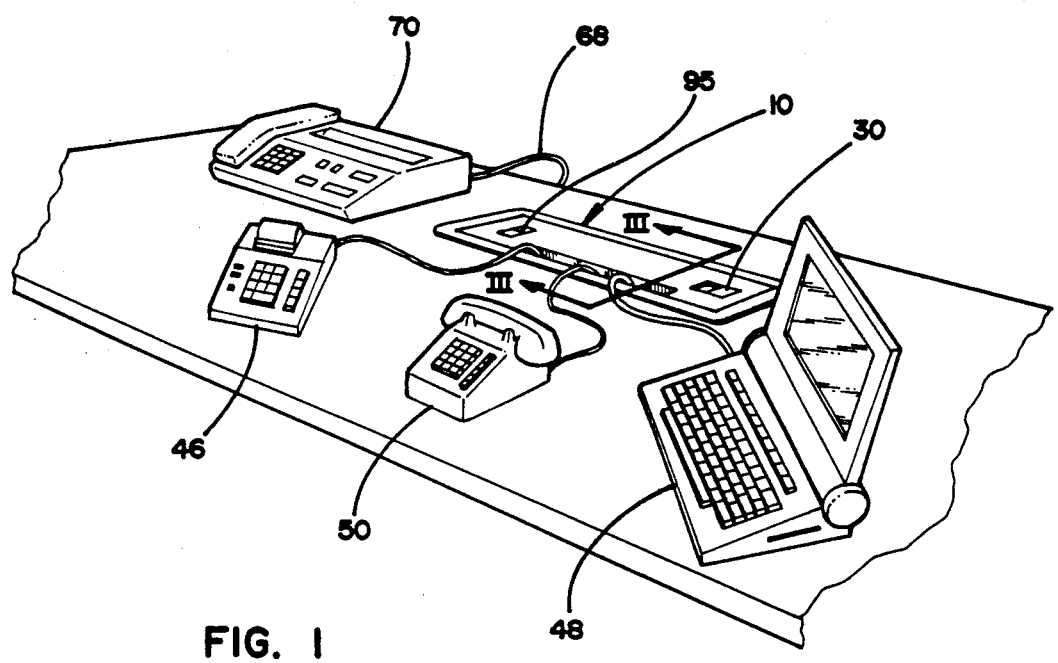
FIG. 1 is a perspective view of the desktop incorporating the wire management apparatus of the present invention.

Referring to the drawings, wire management apparatus 10 constructed in accordance with the present invention comprises two separate elements which may be used together or separately. One of the elements is a desktop wire access cover mechanism 12 which fits in a rectangular opening 20 in a desktop 14. The other element is a wire storage compartment 16 that is mounted underneath the desktop, desirably underneath the wire access cover when the two elements are used together.

Wire access cover mechanism 12 comprises a rectangular frame or bezel 18 that fits in a mating opening 20 in the desktop. Bezel 18 includes a rectangular collar 22 that extends downwardly in the desktop around the periphery of the opening in the desktop and an outwardly extending horizontal flange 24 that extends over the edge of the desktop opening around the periphery of the collar. The bezel forms a border or rim around the desktop opening.

Figure 4:
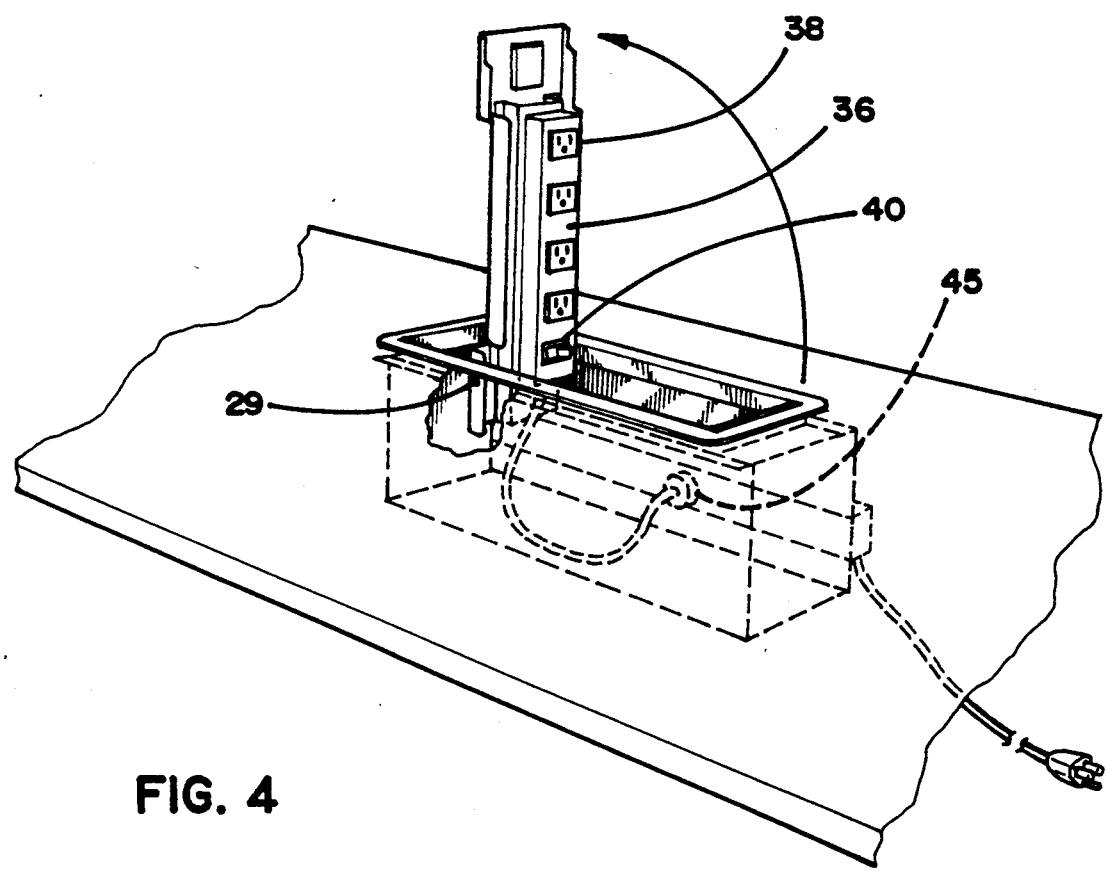
FIG. 4 is a perspective view of the wire management apparatus of the present invention, showing the access door in its raised position with a temporary power tap mounted on the underside of the door.
Figure 10:
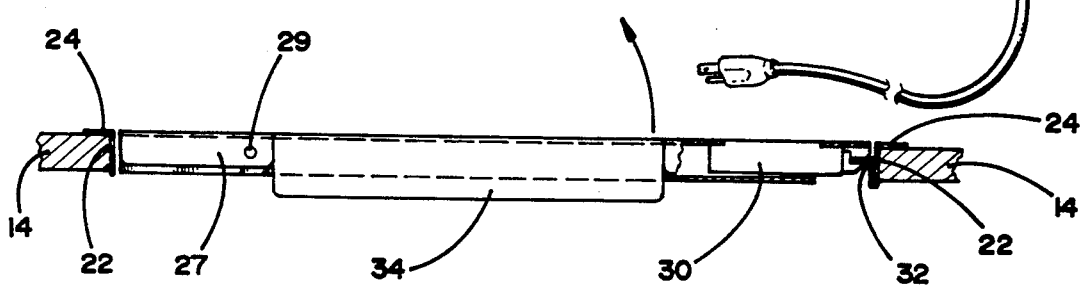
FIG. 10 is a view taken along line 10—10 of FIG. 2.

An access door 26 is pivotally mounted in the bezel for movement between a closed position (shown in FIGS. 1 and 2) and an open position (shown in FIG. 4). The door is a flat plate having downturned side edges 27 and a slot or access opening 28 at the front edge for wire passage when the door is closed. A raised hat channel 31 is spot welded to the underside of the door. The door is pivotally mounted in the frame by pivot pins 29 at a position about one third of the way between the ends of the door. The short end of the door thus pivots downwardly into the desktop opening when the door is raised. A slidable latch 30 actuated from the top of the desktop slides underneath a tab 32 extending inwardly from the frame to lock the top in a closed position (see FIG. 10). Preferably the latch is spring biased towards a closed position.

A flange 34 extends downwardly from the underside of the door adjacent the rear edge of slot 28. The flange extends downwardly a sufficient distance to at least conceal partially the interior of the wire compartment and a temporary power tap 36 mounted on the underside of the door when the door is closed. It also serves to guide the wires downwardly through the opening into the interior of the wire storage compartment.

As shown in FIG. 4 the temporary power tap may be of any conventional design and is attached to the underside of the door, with electrical outlets 30 being positioned on the portion of the door that opens upwardly and the cord portion of the power tap being mounted toward the end of the door that pivots downwardly into the wire storage compartment. Thus, when the door is opened, the outlets are presented for access while the wiring remains concealed below the desktop. The temporary power tap may include a number of electrical outlet receptacles 38 and a master switch 40. The master switch can also be a circuit breaker for a surge suppressor or the like.

Figure 5:
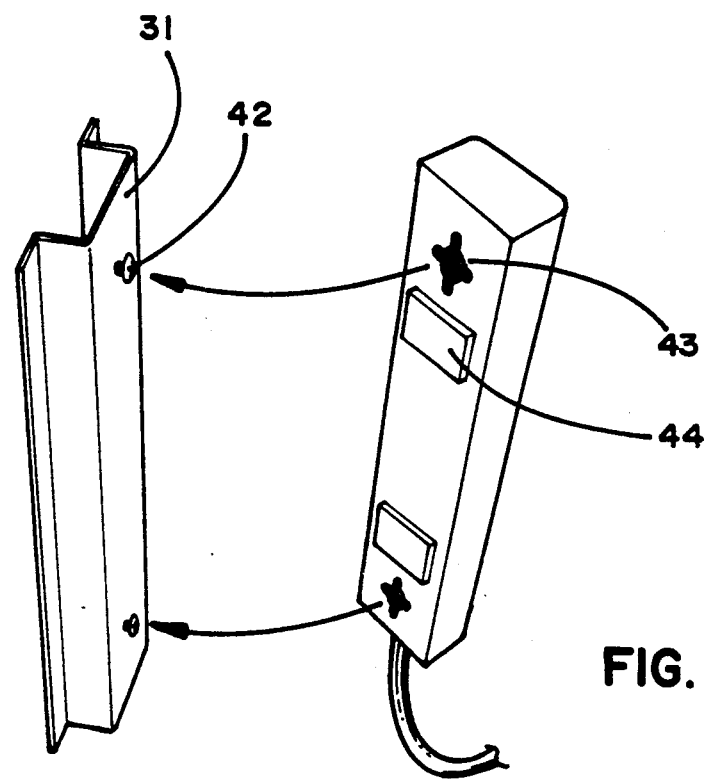
FIG. 5 is a perspective view showing the manner in which the temporary power tap is mounted on the underside of the door.
Figure 6:
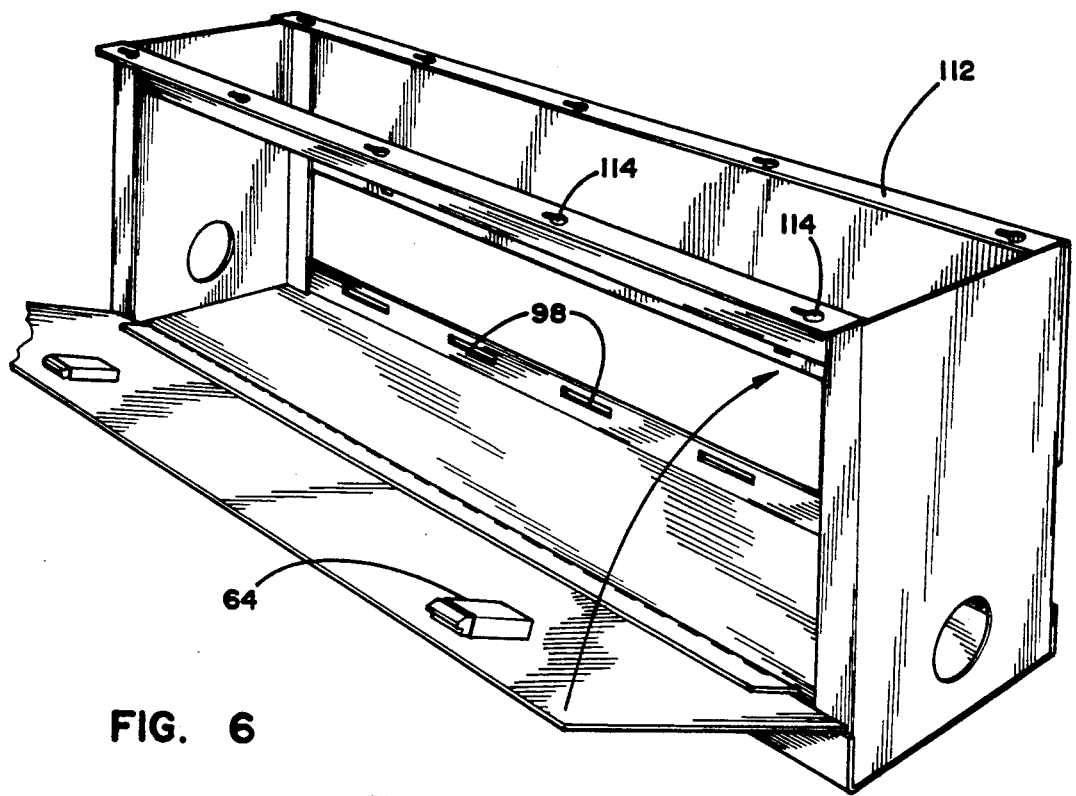
FIG. 6 is a perspective view of the wire storage compartment of the present invention.

The temporary power tap is attached to the underside of the door in a manner such that the temporary power tap can be removed without the use of tools. A conventional keyway mounting mechanism or similar mechanism employing a cross shaped opening 43, as shown in FIG. 5, can be employed. In either case, a screw 42 is threaded into a threaded opening in the hat channel 31 of the cover so that a portion of the head is spaced away from the cover. The screw heads are fitted into the center of opening 43 in the power tap and then the power tap is slid to the side so that the screw becomes locked under narrower flanges in the power tap. In order to obtain a secure fit between the power tap and the underside of the cover, rubber pads 44 having a pressure sensitive adhesive on one side are first affixed to the power tap. When the power tap is pressed against the underside of the cover to insert the screws 42 into the locking openings 43, the rubber pads 44 are compressed and resiliently hold the power tap in its locked position on the underside of the cover. The outlet plug 45 of the temporary power tap can be activated by plugging it into a receptacle mounted in the interior of the wire storage compartment (see FIG. 4), or the temporary power tap can be plugged directly into a conventional wall receptacle. The temporary power tap and the access door do not require a wire storage compartment mounted on the underside of the desktop, although the wire storage compartment does provide additional advantages.

Figure 2:
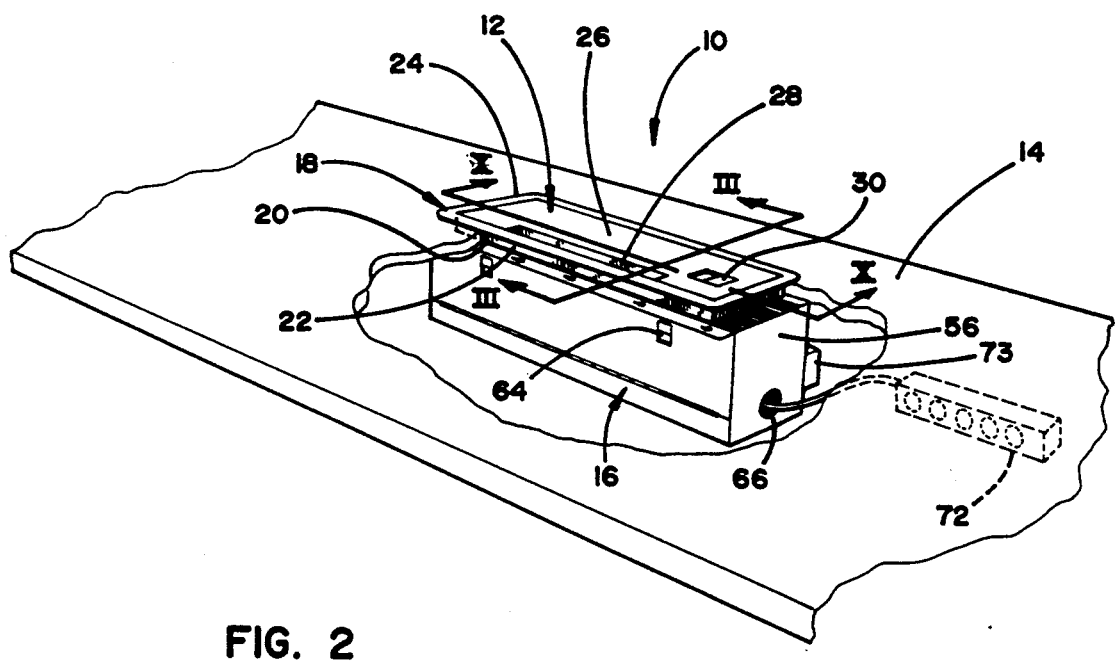
FIG. 2 is a perspective view of the apparatus in FIG. 1, with the desktop being partially broken away to show the wire storage compartment mounted underneath the surface of the desk.

Used alone or in conjunction with the wire storage compartment of the present invention, the wire access mechanism provides a convenient means for providing wiring access to a desktop for a wide range of conventional electronic components, such as the calculator 46, computer 48, and telephone 50 shown in FIG. 1. Whether or not a wire storage compartment is used, the wiring can be stored below the desktop with only the amount of wiring necessary to reach the appliance being exposed. This feature is particularly desirable in open office systems wherein the desktops are mounted flush against the wall panel and provide no means for wire passage to a position below the desktop.

The wire storage compartment 16 of the present invention comprises a rectangular housing having an open top, a front wall 50, a rear wall 52, a bottom 54, and opposed ends 56. An front cover 58 is pivotally mounted on an elongated front access opening 60 that extends substantially the entire length of the front wall 50 of the housing. The front cover is mounted to the opening in the housing by means of a piano type hinge 62 mounted at the lower edge of the opening. The front cover opens downwardly and away from the housing (forwardly toward the front of a desktop) and is held in its locked position by a conventional slidable latch 64 of the same type as latch 30 for the wire access door, which fits over the rolled upper edge 65 in the front wall at the upper edge of opening 60. The latch is movable between open and closed positions by sliding the latch up and down. A pair of latches may be used for longer wire storage compartments.

Figure 3:
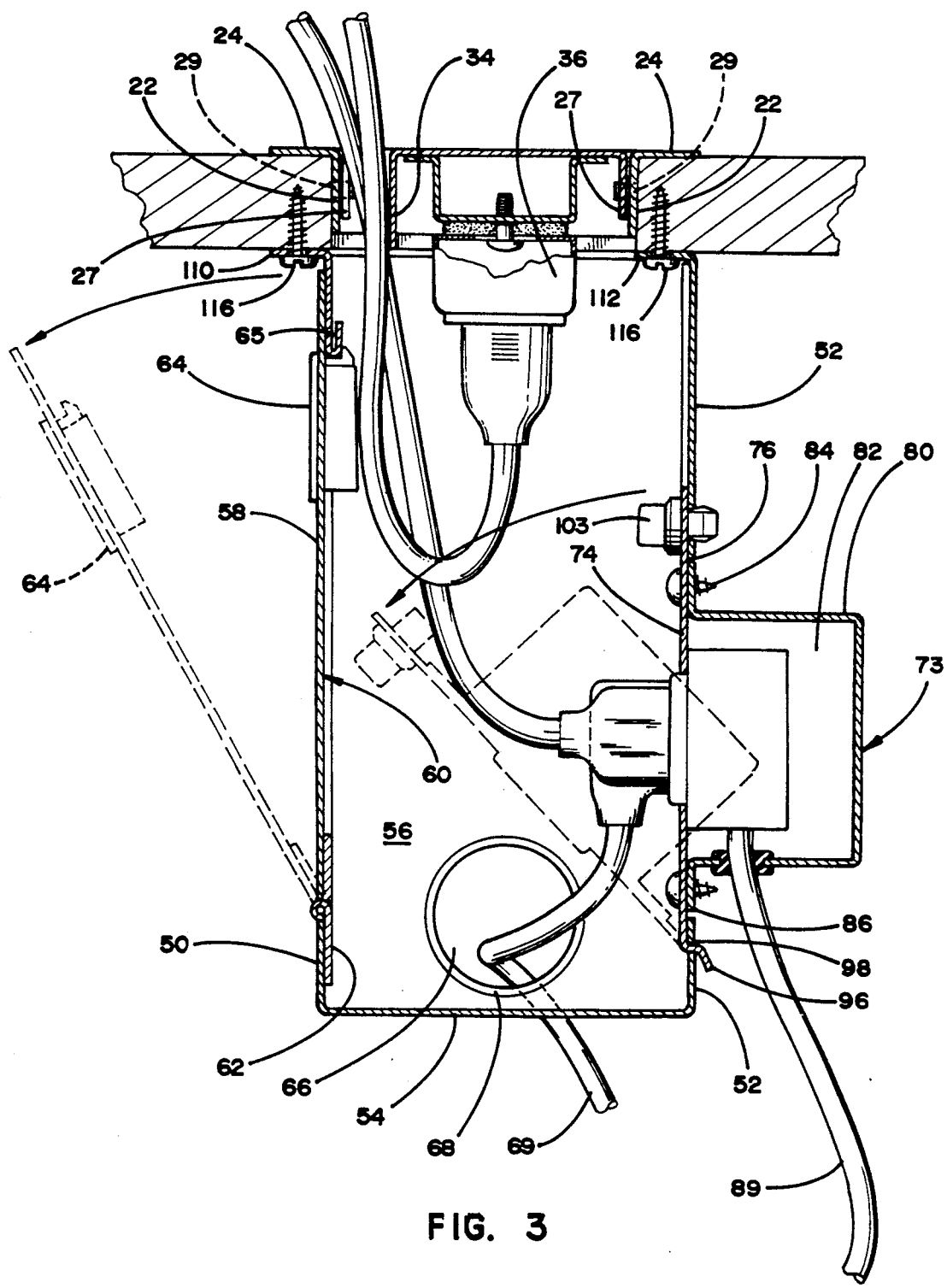
FIG. 3 is a sectional view taken along lines 3—3 of FIG. 2.

End plates 56 of the wire storage compartment are provided with openings 66, with plastic grommets 68 being fitted in the openings. These openings are used for wire access to the interior of the wire housing in situations where the wiring is not passed downwardly through a wire access opening in the desktop. For example, in FIG. 1, the power outlet cord 69 of a fax machine 70 extends over the rear of the desktop instead of through the wire access opening. This wire then passes through opening 66 into the interior of the wire storage compartment for connection with an electrical outlet (see FIG. 3). These openings also can be used for wiring a satellite temporary power tap of the type represented by power tap 72 in FIG. 2. This power tap may be mounted on the underside of the desk in a location spaced away from the wire storage compartment and may be connected to an electrical outlet through opening 66.

While the wire storage compartment can function as a wire receptacle alone in order to keep extra wiring in a closed compartment off a desktop, an additional feature conveniently incorporated in the wire storage compartment is one or more self-contained outlet assemblies or wiring modules 73 attached to the back of the wire storage compartment. Each wiring module includes a face plate 74 pivotally mounted on the inside of an opening 76 that extends along the length of the rear wall 52 of the wiring compartment at a position above the bottom of the compartment. The face plate 74 has a number of openings for various types of wiring receptacles, such as duplex receptacles 77 or communication receptacles and the like. The receptacles can be clipped into these openings or they can be fastened into the openings with conventional fasteners. A channel shaped housing or module cover 80 is mounted on the rear of the face plate so as to cover the backs of the receptacles and enclose the wiring extending from the receptacles. End plates 82 cover the ends of the channel. The channel is attached to the face plate by screws 84 or the like that extend through outwardly extending flanges 86 on the edges of the channel adjacent the face plate. The combination of the outlets, the face plate and the attached cover form a self-contained outlet assembly or module. This module can be operated separately even if it is not attached to the wire storage compartment. The wiring in the module can be powered either by a conventional cord 89 with a plug from a wall or floor receptacle, or the wiring can be hard wired into a source of electrical power. The individual receptacles can be connected to a master switch or circuit breaker 91 mounted in the outlet module and having a switch accessible from the face plate. The switch can also incorporate a surge suppressor or the like. The wiring exits the outlet module through an opening 93 in the bottom of the outlet module at one end thereof.

An important feature of the present invention is the position in which the wiring module is mounted. The wiring module is mounted above the bottom of the wiring compartment and is positioned with the receptacles vertically oriented such that the receptacle openings are generally horizontal. With this mounting position, liquids accidentally poured into the wiring compartment can collect in the bottom of the compartment without flowing into the receptacle openings. These are important safety features of the present invention.

As an additional feature of the present invention, a master control switch 95 (FIG. 1) can be incorporated into the upper surface of the access door so that all of the outlets in the outlet assembly can be switched on and off together. To accomplish this, the wiring module can be connected to a switch on the underside of the access door and then the switch on the access door is wired to a power source.

With the electrical wiring being provided to the wire storage compartment in the form of removable, self contained modules, a wide variety of electrical services can be conveniently incorporated into different modules, simply by selecting a different outlet pattern for the modules. Another feature of this system is that separate modules can be connected end to end in the same wire storage compartment. This is particularly advantageous when it is desired to shield communications cables from power cables. The entire system is made of sheet metal, and the self-contained wiring modules provide shielding around the respective outlets.

Figure 9:
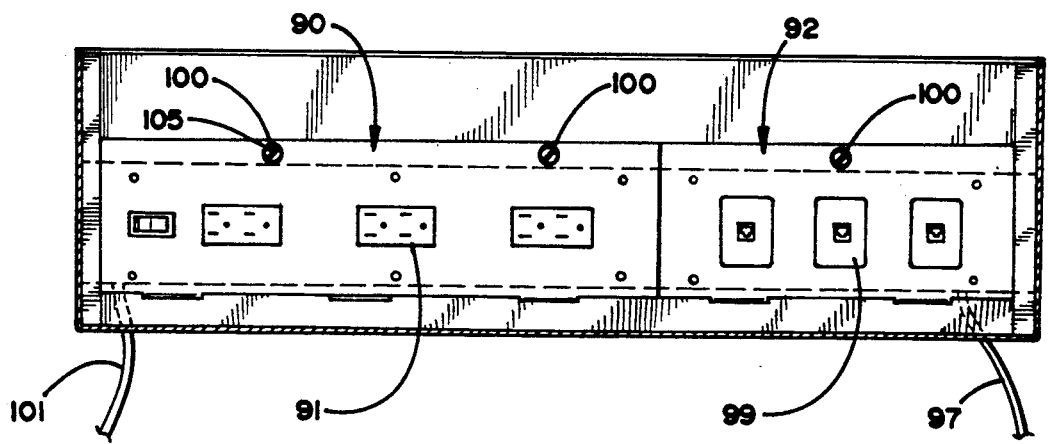
FIG. 9 is a view similar to FIG. 8 showing an alternative construction wherein separate removable outlet modules are mounted on the removable storage compartment side by side, with one module being for power cables and the other module being for communications cables.

As shown in FIG. 9, an electrical power outlet module 90 with three three prong power receptacles 91 is positioned at the left hand end of the wiring compartment and is connected to a source of power by cable 101. Communications cables 97 are conveyed to their own outlet receptacles 99 in a separate wiring module 92 positioned at the right hand side of the wiring compartment.

Figure 8:
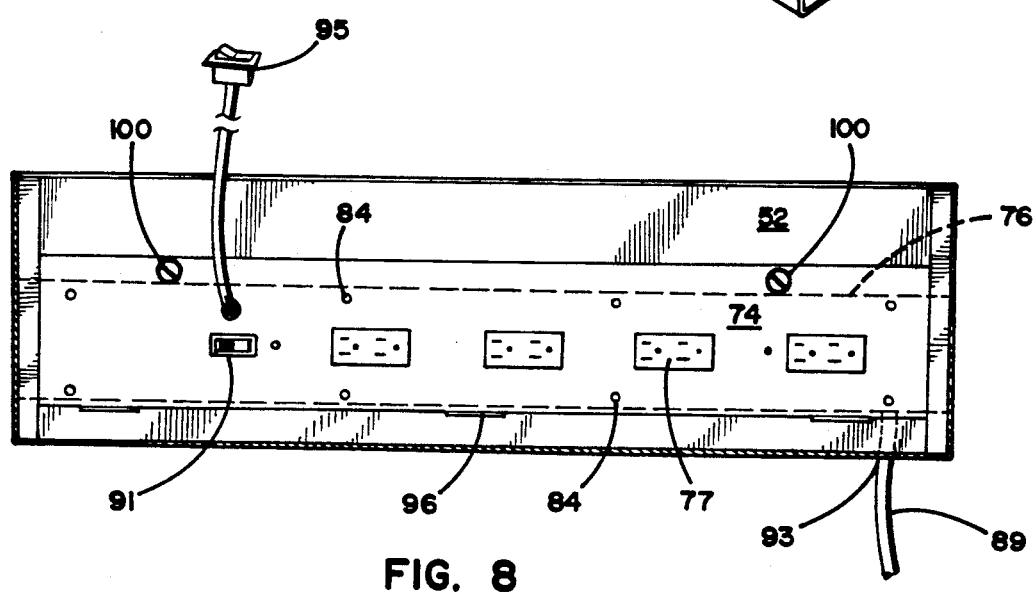
FIG. 8 is a front elevational view of the interior of the wire storage compartment, showing the removable outlet assembly mounted in the storage compartment.
Figure 7:
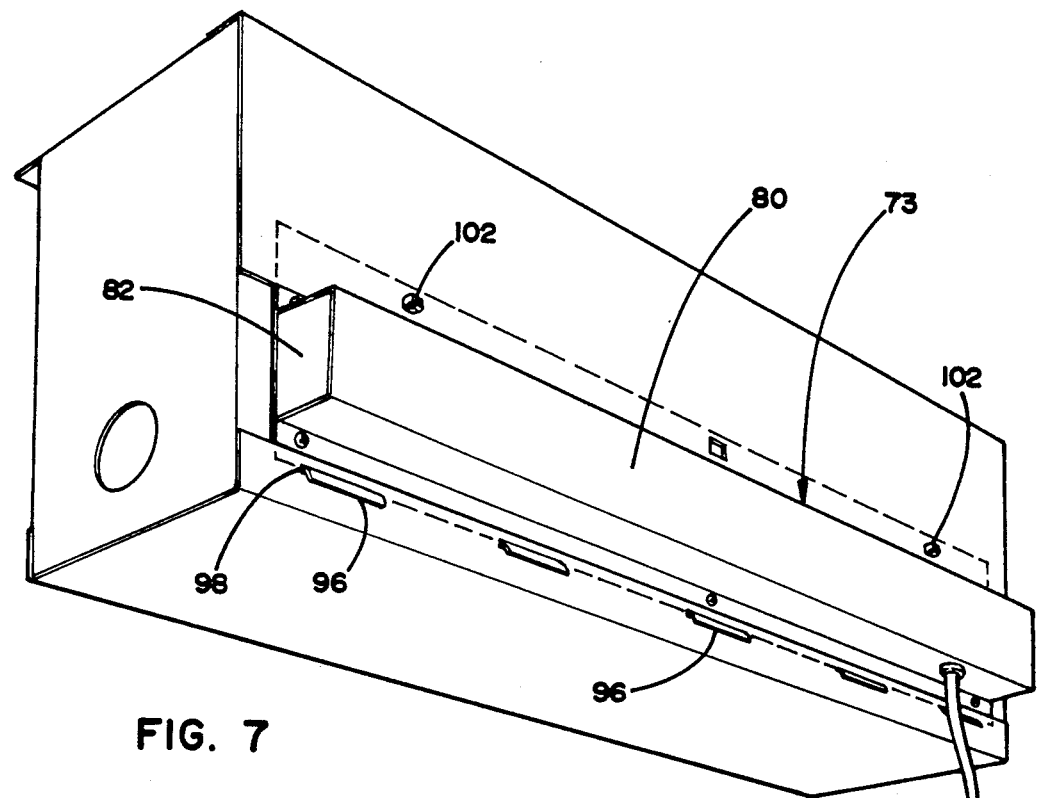
FIG. 7 is a perspective view of the rear of the wire storage compartment of the present invention, showing the manner in which the removable outlet assembly is attached to the rear of the storage compartment.

In both cases, the wiring modules are mounted in the wiring compartment by means of a simple flange type hinge mechanism. A series of flanges 96 extend outwardly at an angle and the downwardly from the bottoms of the face plate at a position offset from the plane of the face plate. The flanges fit through slots 98 in the rear wall of the wire storage compartment adjacent the lower edge of the opening in the wall. The face plate can pivotally open and close over the opening by engagement of the flanges in the slots. The face plate is held in its closed position by means of conventional rotatable plastic fasteners 100, shown in FIGS. 3 and 8, that fit through square openings 102 in the upper surface of the face plate and mating square openings in the rear wall of the wire storage compartment. When the wiring modules are wired by conventional plugs into conventional outlets the fasteners have manually graspable tabs 103 (FIG. 3) latching and unlatching the fasteners. However, when the module is hand wired into the electrical power supply, the latch has a coin slot 105 (FIG. 9) and is operated by turning a coin in a slot instead of by manually twisting a flat flange. Because the hardwired modules are not intended to be user removable, the access is made slightly more restrictive by requiring a tool (e.g., a coin) to turn the latch. The wiring modules are easily mountable and dismountable by turning the fastener to expand the fastener into a locking position in the square opening in the rear wall. By rotating the latch, the entire wiring module can be connected to and removed from the wire storage compartment. To do this, the front access door is opened, the latch is turned to an unlatched position, and the wiring module is pivoted forwardly and then the tabs on the face plate are lifted out of the slots in the back panel. The wiring module is then removed through the front access opening. The wiring module also could conceivably be removed through the rear opening after it is turned sideways.

When it is desired to employ the present invention without any electrical outlets, a blank face plate can be mounted over the opening in the rear panel of the wire storage compartment in order to close off the interior of the compartment.

The wire storage compartment is mounted on the underside of a desktop by means of forwardly extending flanges 110 and 112 on the front and rear edges of the wire storage compartment. The forward extension of the flanges on both the front and rear edges facilitates access to the mounting mechanism from the front side of the desktop. This is an important feature, because access to the rear of the wire storage compartment may be quite difficult in some situations.

The wire storage compartment is attached to the underside of the desk by keyhole slots 114 in the flanges of the wire storage compartment that fit over the heads of screws 116 partially threaded into the desktop. To install the wire storage compartment, the screws are placed in their proper locations and threaded part way in. The wire storage compartment is then mounted on the screws and slid laterally so that the screws are positioned in the narrow portions of the keyhole slots. The screws are then tightened to lock the unit in place. With this type of fastening mechanism, the wire storage compartment can be removed simply by loosening the screws and sliding the compartment on the screws to the enlarged portions of the keyhole slots, without removing all of the screws from the desktop.

The wire storage compartment and wiring modules can be used conveniently with the wire access door mechanism in order to provide convenient access to the desktop for power and communication cables extending from outlet terminals in the wire storage compartment.

It should be understood that foregoing is merely exemplary of the preferred practice of the present invention and the various changes and modifications may be made in the arrangements and details of construction of the embodiments disclosed herein without departing from the spirit and scope of the present invention, which is defined in the appended claims.

I claim:

1. Desktop wire management apparatus comprising:
    an elongated wire storage compartment removably mountable on the underside of a desktop, the wire storage compartment being generally rectangular in shape, having an open top adapted to be in communication with an opening in a desktop and having front and rear walls extending downwardly from a desktop and a bottom enclosing lower ends of the walls, the front wall having a front access opening therein and having an openable front cover mounted over the opening, the front cover being openable in a forward direction toward the front of a desktop, the rear wall of the compartment having a wiring module opening therein positioned above the bottom of the compartment; and
    a self-contained wiring module removably mountable in the wiring module opening, the wiring module including a face plate that is mounted in the wiring module opening, wiring outlet receptacles being mounted on a rear side of the face plate in openings in the face plate and a module cover being mounted over the outlet receptacles, the module cover having an outlet opening for wiring egress to an appropriate power or signal source, the module being self-contained and operable even when separated from the wire storage compartment, the module being held in place in the wire storage compartment by releasable fastener means that permit easy mounting and removal of the module in the wiring compartment.

2. Apparatus according to claim 1, wherein the wiring module is mountable in and removable from the wiring compartment through the front access opening in the compartment while the compartment is mounted on the underside of a desktop.

3. Apparatus according to claim 2, wherein the face plate is pivotally mounted in the opening in the rear panel by tabs that extend downwardly from a lower edge of the face plate and fit into openings in the back panel at the lower edge of the opening, the face plate pivoting downwardly and forwardly from the back panel for insertion and removal of the module in the wiring compartment, the face plate being attachable in a closed position over the opening in the rear panel by releasable latch means for attaching the upper edge of the panel to the portion of the rear panel above the opening.

4. Apparatus according to claim 1, wherein the wire storage compartment has end walls with openings therein for wiring access to the interior of the compartment.

5. Apparatus according to claim 1, wherein the upper edges of the rear and front walls of the wire storage compartment have forwardly extending mounting flanges, the mounting flanges having openings therein through which fasteners can be extended for fastening the wiring compartment to the underside of a desktop.

6. Desktop wire management apparatus according to claim 1, wherein the receptacles are mounted in a generally vertical plane with connector openings in the receptacle positioned in a generally horizontal plane, such that liquids spilled into the wiring compartment will not flow downwardly into the receptacle connector openings.

7. Desktop wire management apparatus according to claim 1 and further comprising an access door pivotally mounted in a frame that is in turn mounted in a rectangular opening in a desktop over the wire storage compartment, the access door having a wiring egress slot between the door and the frame.

8. Desktop wire management apparatus according to claim 7, wherein the wire egress slot is in a front edge of the access door, and the access door includes a downwardly extending flange adjacent a rear edge of the slot, the flange at least partially concealing the interior of the wire compartment front view from a front side of a desk.

9. Desktop wire management apparatus according to claim 8 and further comprising a temporary power tap removably mounted on the underside of the access door, the temporary power tap being concealed behind the flange adjacent the rear edge of the slot, the temporary power tap being connected to an outlet power receptacle in the wiring module.

10. Desktop wire management apparatus according to claim 7 and further comprising a master power switch on an upper side of the access door, the master power switch being connected into the wire module wiring so as to serve as a master power switch for the entire wiring module.

11. A concealed electrical power system mountable in an elongated opening in a desktop comprising:
    an elongated frame that fits in the opening, the frame having a depending collar that extends downwardly into the opening and a horizontal, peripheral flange that fits over an upper peripheral edge of the opening, the frame having an opening therethrough inside of the flange;
    an access door pivotally mounted in the frame so as to cover the opening in the frame, the door being elongated and being pivotally mounted in the frame at a point adjacent one of the ends but spaced therefrom a predetermined distance so as to form a short side and a long side of the door on opposite sides of the pivot point, the frame being constructed such that the short end of the door pivots downwardly into the opening when the door is opened, while the long side pivots upwardly to a generally upright position and extends upwardly from the frame when the cover is opened; and
    a temporary electrical power tap removably mounted on the underside of the door, the temporary power tap comprising an elongated electrical outlet assembly having multiple electrical outlets attachable to the underside of the door with the electrical outlets facing downwardly from the underside of the door, the outlet assembly being powered by an electrical power cord extending from one end of the assembly, the assembly being mounted on the door such that the outlets are positioned substantially on the long side of the door and are exposed above the frame for access when the door is raised, the end to which the power cord is attached being positioned on the short end of the door such that the short end and the power cord pivot downwardly into the opening in the frame to a position of minimized visibility when the door is opened, the outlet assembly being further positioned towards a back side of the door from a front-rear viewpoint, with a front edge of the door having a slot between the frame and the door for wiring egress, a flange extending downward from the door adjacent a rear edge of the slot to at least partially conceal the power tap from view from a front side of the desktop.

* * * * *